(12) United States Patent
Adoline et al.

(10) Patent No.: US 10,935,096 B2
(45) Date of Patent: Mar. 2, 2021

(54) ELECTROMECHANICAL SPRING SYSTEM

(71) Applicant: Barnes Group Inc., Bristol, CT (US)

(72) Inventors: Jack W. Adoline, Holland, OH (US);
Adrian A. Vine, Ann Arbor, MI (US);
David D. Johnson, Bristol, CT (US);
Phillip A. McConnell, Swanton, OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 14/850,134

(22) Filed: Sep. 10, 2015

(65) Prior Publication Data
US 2016/0084333 A1    Mar. 24, 2016

Related U.S. Application Data

(60) Provisional application No. 62/052,554, filed on Sep. 19, 2014.

(51) Int. Cl.
| | | |
|---|---|---|
| *F16H 29/20* | (2006.01) | |
| *F16F 1/04* | (2006.01) | |
| *F16F 1/12* | (2006.01) | |
| *F16F 15/03* | (2006.01) | |
| *F16F 15/067* | (2006.01) | |
| *F16F 9/56* | (2006.01) | |
| *F16H 25/20* | (2006.01) | |

(52) U.S. Cl.
CPC ............. *F16F 1/041* (2013.01); *F16F 1/121* (2013.01); *F16F 9/56* (2013.01); *F16F 15/03* (2013.01); *F16F 15/067* (2013.01); *F16H 25/20* (2013.01); *F16H 2025/2031* (2013.01); *F16H 2025/2065* (2013.01); *F16H 2025/2071* (2013.01); *F16H 2025/2081* (2013.01)

(58) Field of Classification Search
CPC ......... F16F 1/121; E05F 15/622; F16H 25/20; F16H 2025/2081; F16H 2025/2031; F16H 2025/2065; F16H 2025/2071
USPC ........................................................ 74/89.38
See application file for complete search history.

(56) References Cited

U.S. PATENT DOCUMENTS

| | | | | |
|---|---|---|---|---|
| 4,712,441 A | * | 12/1987 | Abraham | F16H 25/2015 |
| | | | | 74/412 TA |
| 4,858,481 A | * | 8/1989 | Abraham | F16H 25/2015 |
| | | | | 74/89.38 |
| 5,090,513 A | * | 2/1992 | Bussinger | B60K 28/04 |
| | | | | 180/271 |
| 5,195,721 A | * | 3/1993 | Akkerman | F16D 27/105 |
| | | | | 192/56.1 |
| 6,234,034 B1 | * | 5/2001 | Ando | F16H 25/2472 |
| | | | | 187/267 |
| 6,516,567 B1 | * | 2/2003 | Stone | E05F 15/622 |
| | | | | 296/55 |

(Continued)

FOREIGN PATENT DOCUMENTS

| | | | | |
|---|---|---|---|---|
| EP | 1840310 A1 | * | 10/2007 | F16H 25/20 |
| EP | 2604454 | | 6/2013 | |
| WO | 2012040831 | | 4/2012 | |

OTHER PUBLICATIONS

European Search Authority, European Search Report issued in corresponding European patent application (Feb. 19, 2016.

*Primary Examiner* — Nicholas J Lane
(74) *Attorney, Agent, or Firm* — Ulmer & Berne LLP

(57) ABSTRACT

A spring system that includes an adjustable spring system that is operated by a motor.

25 Claims, 5 Drawing Sheets

(56) References Cited

U.S. PATENT DOCUMENTS

| | | | | |
|---|---|---|---|---|
| 7,938,473 B2* | 5/2011 | Paton | ................... | B60J 5/101 |
| | | | | 296/146.8 |
| 2007/0062119 A1* | 3/2007 | Ritter | ................... | F16H 25/20 |
| | | | | 49/343 |
| 2009/0058020 A1 | 3/2009 | Ersoy et al. | | |
| 2009/0200830 A1* | 8/2009 | Paton | ................... | B60J 5/101 |
| | | | | 296/146.8 |
| 2009/0288511 A1* | 11/2009 | Kuribayashi | ........... | F16H 25/20 |
| | | | | 74/89.38 |
| 2010/0186528 A1* | 7/2010 | Hillen | ................... | F16D 7/048 |
| | | | | 74/89.23 |
| 2013/0300044 A1* | 11/2013 | Adoline | ................... | F16F 3/04 |
| | | | | 267/168 |
| 2015/0377329 A1* | 12/2015 | Wu | ................... | F16H 25/20 |
| | | | | 74/89.38 |
| 2017/0081895 A1* | 3/2017 | Osafune | ................... | B60J 5/10 |
| 2018/0100523 A1* | 4/2018 | Fenn | ................... | F16H 25/20 |

* cited by examiner

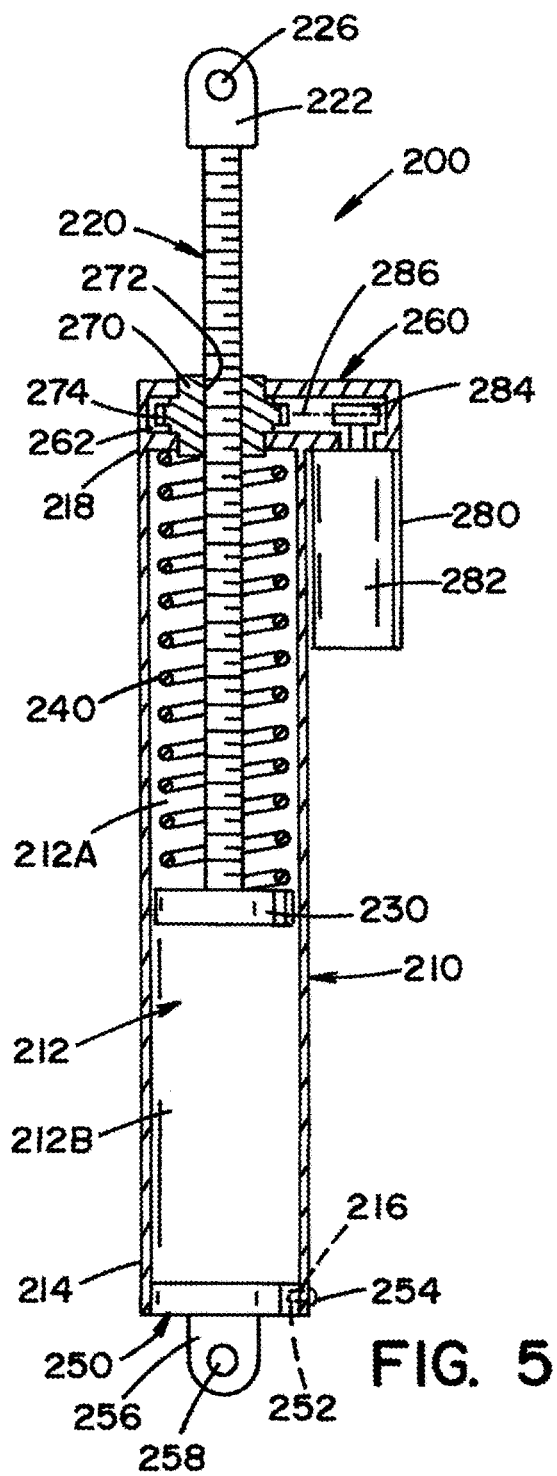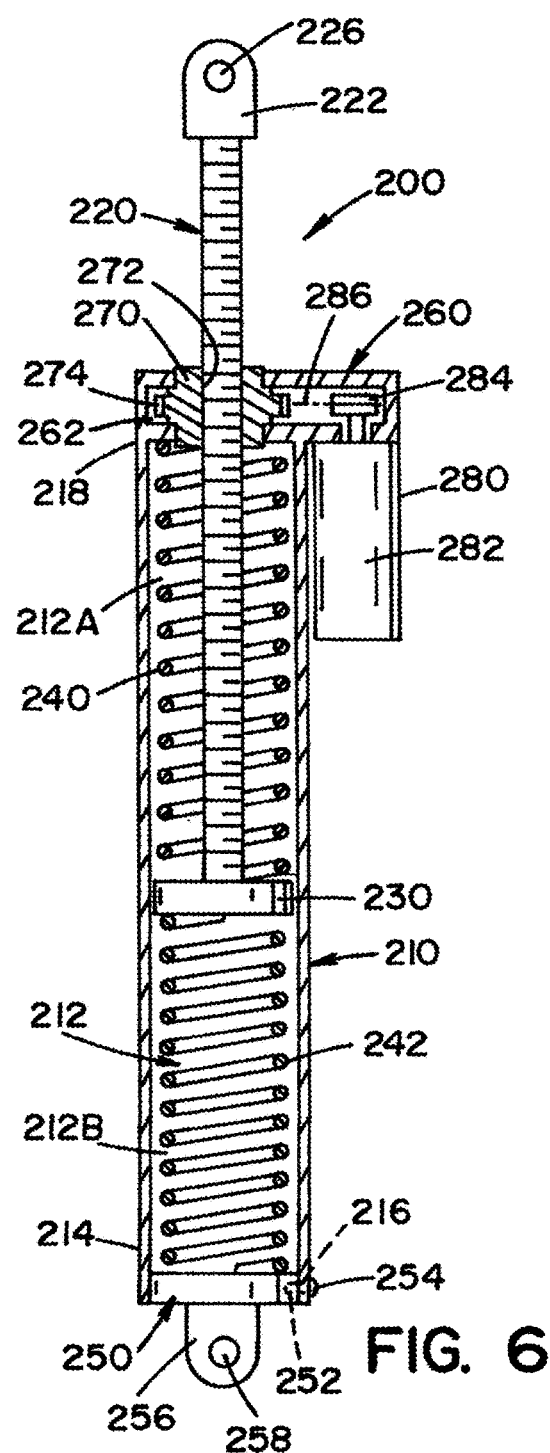

ELECTROMECHANICAL SPRING SYSTEM

The present invention claims priority on U.S. Provisional Patent Application Ser. No. 62/052,554 filed Sep. 19, 2014, which is incorporated herein by reference.

The present invention relates to spring systems, particularly to a spring assembly that includes an adjustable spring system, and more particularly to a spring assembly that includes an adjustable spring system that is operated by a motor. The spring system of the present invention can be used in the medical field, automotive industry, manufacturing industry, building industry, etc. The spring system can include one or more mechanical springs and/or include a compressible fluid.

BACKGROUND OF THE INVENTION

Large spring systems are commonly used in many applications (e.g., construction and agricultural equipment, marine equipment, industrial hutches, industrial equipment, aerospace equipment, heavy trucks, etc.). These large spring systems typically have a large footprint due to the large springs used in the spring system and/or the complicated hydraulic systems used in with the spring system. As such, there is a continued demand for smaller spring systems that can be used to handle large loads.

SUMMARY OF THE INVENTION

The present invention is directed to a novel spring assembly that includes the use of an adjustable spring system that adjusts the compression on one or more mechanical springs in the spring system and/or adjusts the pressure of one or more fluids in the spring assembly. The spring assembly can be adjusted manually and/or by one or more motors. The one or more motors can be an electrical motor, hydraulic motor, fuel-powered motor, and the like.

In one non-limiting aspect of the invention, the spring system of the present invention can be in the form of a spring system; however, this is not required. The spring system includes an outer sleeve having an internal cavity, an inner sleeve that is arranged for sliding displacement in the outer sleeve, a top rod and, optionally, a bottom rod. The internal cavity of the outer sleeve has a generally uniform cross-sectional shape and a generally constant cross-sectional area along a majority (e.g., 51-99.9%) of the longitudinal length of outer sleeve; however, this is not required. The materials used to form the inner sleeve and the outer sleeve are non-limiting. The size, shape and length of the inner sleeve and the outer sleeve are non-limiting. The rear portion of the outer sleeve typically includes a plug; however, this is not required. The plug can be designed to be removable; however, this is not required. Indents in the outer sleeve or other arrangements (e.g., adhesive, rivet, screw, pin, solder, weld bead, melted bond, crimp, etc.) can be used to secure the plug to the outer sleeve; however, this is not required. The rear end of the spring system can optionally include a connection arrangement that can be used to facilitate in connecting the rear of the spring system to a fixture or other structure. The configuration of the connection arrangement is non-limiting (e.g., threaded end, connection hole, grooves, ribs, slots, notches, hook, etc.). The inner sleeve also typically includes an internal cavity. The top portion of the inner sleeve typically includes a plug; however, this is not required. The plug can be designed to be removable; however, this is not required. Indents in the inner sleeve and/or other arrangements (e.g., adhesive, rivet, screw, pin, solder, weld bead, melted bond, crimp, etc.) can be used to secure the plug to the inner sleeve; however, this is not required. The top end of the spring system can optionally include a connection arrangement that can be used to facilitate in connecting the top of the spring system to a fixture or other structure. The configuration of the connection arrangement is non-limiting (e.g., threaded end, connection hole, grooves, ribs, slots, notches, hook, etc.).

The top portion of the outer sleeve can optionally include a tapered region that is designed to prevent the inner sleeve from disengaging from the outer sleeve when the inner sleeve is in the fully extended position. As such, the internal cavity of the outer sleeve can include multiple cross-sectional areas along the longitudinal length of the outer sleeve. Generally, a majority (51-99.5%) of the longitudinal length of the outer sleeve has a cross-sectional area of the internal cavity that is greater than a smaller cross-sectional area of an internal cavity. The bottom portion of the inner sleeve can include an outer cross-sectional area that is greater than the cross-sectional area of the internal cavity at the top portion of the outer sleeve so that the bottom portion of the inner sleeve cannot pass through the internal cavity at the top portion of the outer sleeve. The bottom portion of the inner sleeve can include an outer cross-sectional area that is less than a cross-sectional area of the internal cavity that is located below the top portion of the outer sleeve to that the bottom portion can slidably move within the internal cavity of the outer sleeve. The region between the bottom portion of the inner sleeve and the top portion of the inner sleeve can be tapered; however, this is not required. The cross-sectional shape and size of the bottom portion of the inner sleeve can be selected such that it has the same or similar shape as the cross-sectional shape of the internal cavity of the outer sleeve that is located below the top portion of the outer sleeve, and has a cross-sectional size that is slightly less than the cross-sectional size of the internal cavity of the outer sleeve that is located below the top portion of the outer sleeve. Such a size and shape arrangement can be used to guide the movement of the inner sleeve within the internal cavity of the outer sleeve. As can be appreciated, the spring system can include a third inner sleeve that is configured to move within the internal cavity of the inner sleeve. The shape and size relations of the third inner sleeve relative to the inner sleeve can be similar to the shape and size relationships of the inner sleeve to the outer sleeve as discussed above. As can be further appreciated, additional inner sleeves can be used.

The top portion of the top rod is configured to be connected to the top portion of the inner sleeve (or the third or other sleeve if the spring system includes more than two sleeves). In one non-limiting arrangement, the top portion of the top rod is connected to a top bushing which is in turn connected to the top portion of the inner sleeve; however, other or additional arrangements can be used to connect and/or interconnect the top portion of the top rod to the top portion of the inner sleeve. A piston can be optionally connected to the top rod. The top rod includes an internal cavity and a base portion having an opening that provides access to the internal cavity. The internal cavity generally has a longitudinal length that constitutes a majority (51-99%) of the longitudinal length of the top rod; however, this is not required. The base portion of the top rod can optionally include a bottom rod engagement element that is configured to engage with the bottom rod. In one non-limiting arrangement, the bottom rod engagement element is secured to the base portion of the top rod by indents and/or other arrangements (e.g., adhesive, rivet, screw, pin, solder, weld bead, melted bond, etc.). In another non-limiting configuration, the bottom rod engagement element includes a threaded opening to receive a threaded portion on the bottom rod. The top rod is generally positioned along the central longitudinal axis of the spring system and can be positioned in the internal cavity of the inner sleeve and outer sleeve. The length and shape and material of the top rod are non-limiting. The cross-sectional area of the top rod can be constant or vary along the longitudinal length of the top rod. The cross-sectional area of the top rod is generally less than the cross-sectional area of the internal cavity of the inner sleeve. Generally, the length of the top rod is equal to or greater than the longitudinal length of the internal cavity of the inner sleeve; however, this is not required.

The bottom portion of the bottom rod is configured to be rotatably connected to the bottom portion of the spring system. In one non-limiting arrangement, the bottom portion of the bottom rod is rotatably connected to a drive housing that is connected to the bottom of the outer sleeve. The bottom portion of the rod can optionally pass through an opening in the bushing that is connected to the bottom portion of the outer sleeve. The drive housing can be connected and/or interconnected to the bottom portion of the outer sleeve and/or to the bushing by indents and/or other arrangements (e.g., adhesive, rivet, screw, pin, solder, weld bead, melted bond, etc.). The top portion of the bottom rod includes an engagement portion that is configured to connect to the top rod and/or to the bottom rod engagement element in the top rod. In one non-limiting arrangement, the bottom rod includes a threaded region that is configured to threadedly engage the top rod and/or to the bottom rod engagement element in the top rod. In another non-limiting arrangement, the top portion of the bottom rod is configured to move within the internal cavity of the top rod. The bottom rod is generally positioned along the central longitudinal axis of the spring system and can be positioned in the internal cavity of the inner sleeve and outer sleeve. The length and shape and material of the bottom rod are non-limiting. The cross-sectional area of the bottom rod can be constant or vary along the longitudinal length of the top rod. The cross-sectional area of the bottom rod is generally less than the cross-sectional area of the internal cavity of the inner sleeve and outer sleeve and at least a portion of the top portion of the bottom rod has a cross-sectional area that is generally less than the cross-sectional area of the internal cavity of the top rod. Generally, the longitudinal length of the bottom rod is equal to or greater than the longitudinal length of the internal cavity of the outer sleeve; however, this is not required. Generally, the longitudinal length of the bottom rod is less or equal to the longitudinal length of the internal cavity of the top rod; however, this is not required.

In another non-limiting aspect of the invention, the spring system does not include a bottom rod. The top portion of the top rod is configured to be connected to the top portion of the inner sleeve (or the third or other sleeve if the spring system includes more than two sleeves). In one non-limiting arrangement, the top portion of the top rod is connected to a top bushing and/or drive housing which is in turn connected to the top portion of the inner sleeve; however, other or additional arrangements can be used to connect and/or interconnect the top portion of the top rod to the top portion of the inner sleeve. A piston can be optionally connected to the top rod. The top bushing and/or drive housing can optionally form or include a top rod engagement element. In one non-limiting arrangement, the top rod engagement element includes a threaded opening to receive a threaded portion on the top rod. The top rod engagement element can be configured to rotate when the drive system in the drive housing is activated; however, this is not required. In one non-limiting configuration, the top bushing or a portion of a top bushing is caused to be rotated by the drive system in the drive housing. In another non-limiting configuration, a gear and/or threaded element located in the top bushing or which is part of the drive housing is configured to rotate when the drive system in the drive housing is activated; however, this is not required. The top rod is generally positioned along the central longitudinal axis of the spring system and can be positioned in the internal cavity of the outer sleeve. The length and shape and material of the top rod are non-limiting. The cross-sectional area of the top rod can be constant or vary along the longitudinal length of the top rod. The cross-sectional area of the top rod is generally less than the cross-sectional area of the internal cavity of the outer sleeve. Generally, the length of the top rod is equal to or greater than the longitudinal length of the internal cavity of the outer sleeve; however, this is not required. The top rod is configured to be rotatably connected to the top portion of the spring system. The top portion of the rod is configured to pass through an opening in the top bushing and/or drive housing that is connected to the top portion of the outer sleeve. The drive housing can be connected and/or interconnected to the top portion of the outer sleeve and/or to the top bushing by indents and/or other arrangements (e.g., adhesive, rivet, screw, pin, solder, weld bead, melted bond, etc.). The top portion of the top rod includes an engagement portion that is configured to connect to the top bushing and/or to the drive housing. In one non-limiting arrangement, the top rod includes a threaded region that is configured to threadedly engage the top bushing and/or to the drive housing. The top end of the top rod can optionally include a connection arrangement (e.g., threaded end, connection hole, grooves, ribs, slots, notches, hook, etc.).

In still another and/or alternative non-limiting aspect of the invention, the interior cavity of the inner sleeve and/or outer sleeve optionally includes a fluid (e.g., gas, liquid, etc.) and/or one or more mechanical springs. If one or more pistons are connected to the top and/or bottom rod, the one or more pistons can be used to form separate chambers wherein one or more of the chambers can optionally include a fluid (e.g., gas, liquid, etc.) and/or one or more mechanical springs. The one or more pistons can optionally include seals, passageways, valves, etc. to controllably allow fluid to pass through and/or about the one or more pistons; however, this is not required. The piston, when used, is generally connected to the end portion of the top and/or bottom rod; however, this is not required. The piston can be connected to the top and/or bottom rod by any number of means (e.g., adhesive, screw, rivet, nail, pin, solder, weld bead, melted bond, etc.). When one or more mechanical springs are optionally used, such one or more springs can be located on one or both sides of the piston. When two or more mechanical springs are located in the internal cavity of one or more of the sleeves, the spring free length, wire type, wire thickness, cross-sectional shape of the wire, number of windings, wire material, and/or spring force of each spring can be the same or different. The free length of the one or more mechanical springs can be greater than, equal to, or less than the longitudinal length of the cavity of the one or more sleeves. As can be appreciated, when two or more springs are located on the same side of the piston, two or more of the springs can optionally be in a nested relationship and have the same or different direction of windings. As can be appreciated, a fluid (e.g., gas and/or liquid) optionally can be located on one or both sides of the piston. The fluid can be used in combination with one or more springs or as a substitute for one or more springs in the spring system. When fluid is included in the internal cavity of the one or more sleeves, the piston can be designed to controllably allow the fluid to flow through or past the piston as the piston moves along the longitudinal length of the one or more sleeves; however, this is not required.

In yet another and/or alternative non-limiting aspect of the invention, the drive housing includes a motor, sprocket and optionally one or more gears. The type (electric, hydraulic, combustion, etc.), size, and power of the motor are non-limiting. In one non-limiting configuration, the motor is an electric motor. The drive housing can optionally include a battery pack and/or battery housing. In another non-limiting configuration, a sprocket or gear is connected to the end of the motor which is configured to directly engage the top rod, the bottom rod, a gear system or a rotatable component of the drive housing that engages the top or bottom rod. When a gear system is optionally used, the gear system can be used to adjust the gear ratio between the motor and the rotation speed of the top or bottom rod. The size and number of gears used are non-limiting. The drive housing can optionally include a clutch or other type of release feature to enable the motor to be disengaged from the top rod, the bottom rod, a gear system or a rotatable component of the drive housing that engages the top or bottom rod. The clutch or other type of release feature can be configured to allow for manual disengagement and/or automatic disengagement of the motor from the top rod, the bottom rod, a gear system or a rotatable component of the drive housing that engages the top or bottom rod. In one non-limiting arrangement, the clutch or other type of release feature is configured to allow for manual disengagement of the motor from the top rod, the bottom rod, a gear system or a rotatable component of the drive housing that engages the top or bottom rod.

Non-limiting features of the spring assembly of the present invention are described below.

1. The spring system includes a motor (electrical, pneumatic or hydraulic), the type and size of which depends on the specific application of the spring system and the desired power source of the motor:
   a) the power of the motor is generally smaller relative to the force/speed of the spring assembly.
2. The spring system optionally includes a clutch/coupling mechanism used in combination with the motor:
   a) the clutch/coupling mechanism can optionally include a release feature that allows for manual override of spring assembly so as to bypass the motor and is thus an important feature for fail safe applications,
   b) the clutch/coupling mechanism can optionally include coupling via gears, belts, chains, etc. which allows for variable ratio of rotary motion. In one non-limiting arrangement, there is provided a 1:1 ratio; however, many other ratios can be used.
3. The spring system includes a rotary to linear motion conversion mechanism (e.g., ball screw, acme screw, lead screw, rack and pinion, etc.):
   a) when the spring assembly includes a clutch release feature, a non-locking pitch in the rotary to linear motion conversion mechanism may be required,
   b) the rod engagement element (e.g., nut, etc.) can optionally be supported with the longer element to shorten the length of the screw/lead component and increase the buckling force. This can be advantageous when the stroke of the spring system is less than half the length of the overall spring system.
4. The spring system can optionally include one or more mechanical springs:
   a) the one or more springs can be used in the spring assembly and are designed to counterbalance all or part of the load on the spring assembly. In one non-limiting configuration, the one or more springs are selected to be equal to or close to neutral/balance.
   b) the one or more springs can be positioned in compartments on either side of the spring assembly or on both sides of the spring assembly. The configuration of the one or more springs is dependent on the specific application of the spring system. The one or more springs can be arranged to achieve the following i) compressive/push force, ii) traction/pull force (still with the use of compression spring), and or iii) self-centering force (somewhere between fully extended and fully compressed, but not necessarily in the center).
5. The spring system includes a housing;
   a) one non-liming housing is a telescoping tube cover for two or more sleeves.
      i. the support of the rod engagement element (e.g., nut, etc.) can serve as a spring guide.
      ii. the support end can be used on the wider end of the tube when using the tube design since there is more freedom of motion of the one or more springs and the reduction in risk to the damaging the thread of the lead screw or ball screw.
   b) the spring system can optionally have a compact rod and tube design.
      i. the motor, clutch, etc. can be moved to or close to the central/mid portion of the spring assembly (i.e., rod on one side, tube on the other).
6. Other optional features of the spring system include:
   a) the spring system can be self-locking when power to the motor is lost (e.g., motor and gearing is in the form of brake in this scenario).
   b) various motor orientation can be used; for example, i) the motor can be offset from the spring system (which can be advantageous for spatial constraints of length) and/or ii) the motor can be in line with spring system (which can be advantageous for spatial constraints of diameter envelope).
   c) friction reducing elements can be used.
      i. the tube to tube joint arrangement can be configured to have a friction reducing design to improve efficiency of the spring assembly (e.g., Teflon or other anti-friction coatings, etc.).

Non-limiting applications of the spring assembly of the present invention are as follows: a) construction and agricultural equipment, such as hatch, hood, door, and service panel actuation mechanisms; b) marine equipment, such as wake tower fold down actuation mechanisms and hatch actuation mechanisms, c) industrial hatches (including road, sidewalk, airport, and utility ground/roof access hatches), such as open/close actuation mechanisms, d) industrial equipment, such as actuation mechanisms, e) aerospace equipment, such as actuation mechanisms, and/or f) heavy truck equipment, such as hood lifts, cab lifts, and access panel lifts.

These and other objects and advantages will become apparent from the following description taken together with the accompanying drawings.

BRIEF DESCRIPTION OF THE DRAWINGS

Reference may now be made to the drawings, which illustrate several non-limiting embodiments that the invention may take in physical form and in certain parts and arrangements of parts wherein;

FIG. 5 is a sectional view of another non-limiting embodiment of the spring system in accordance with the present invention; and FIG. 6 is a sectional view of another non-limiting embodiment of the spring system in accordance with the present invention.

DESCRIPTION OF NON-LIMITING EMBODIMENTS

Figure 1:
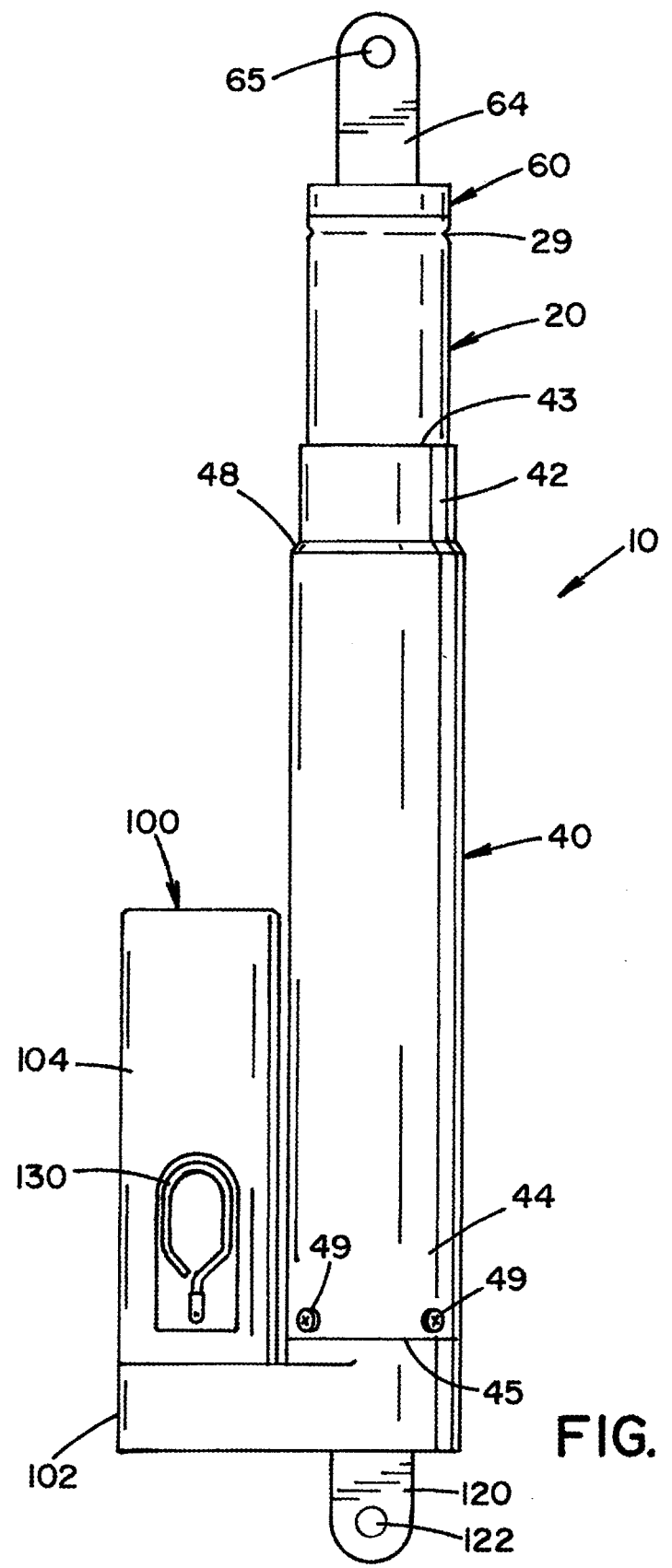
FIG. 1 is a side plan view of the spring system according to one non-limiting embodiment.
Figure 2:
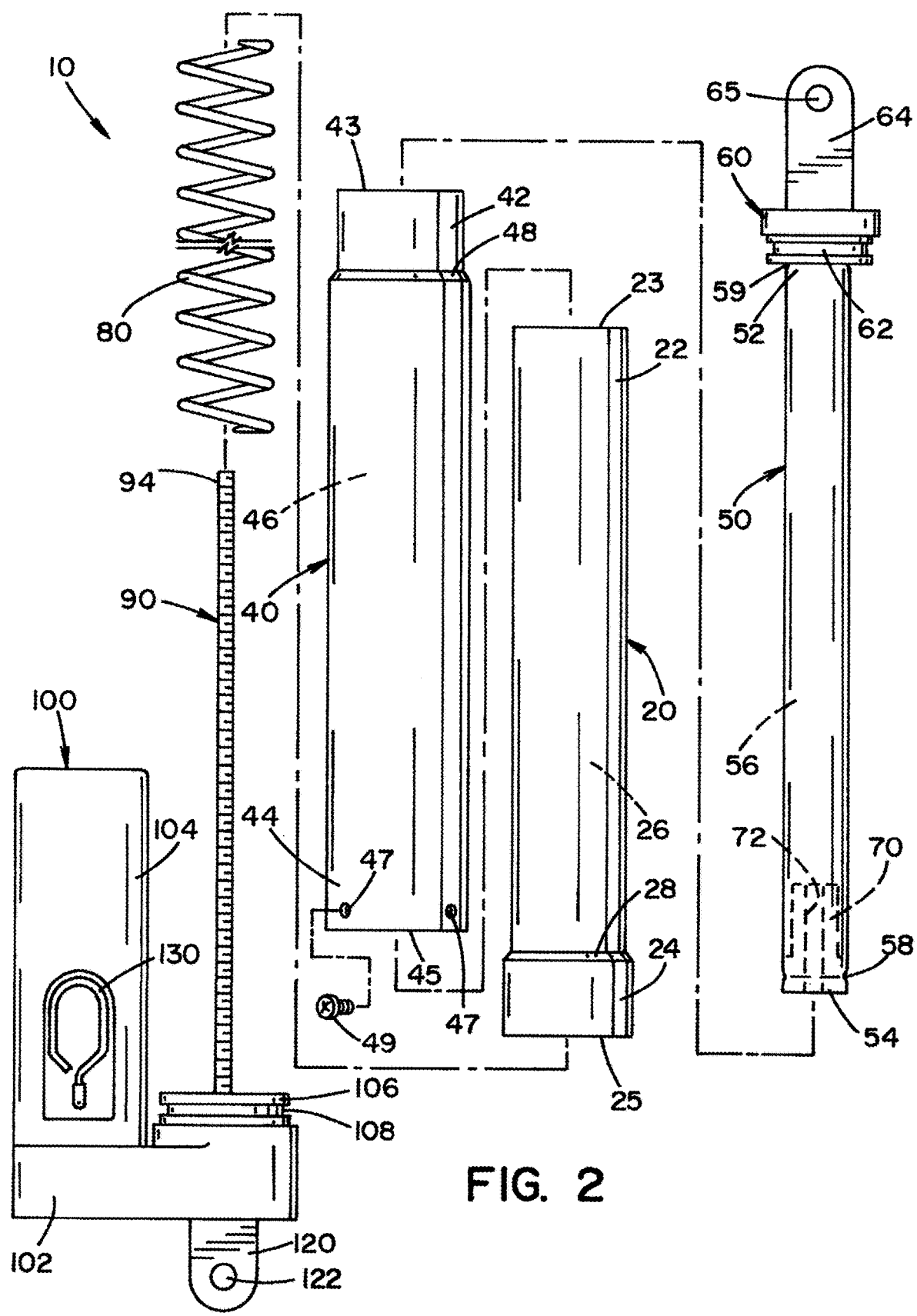
FIG. 2 is an exploded view of the spring system of FIG. 1.
Figure 3:
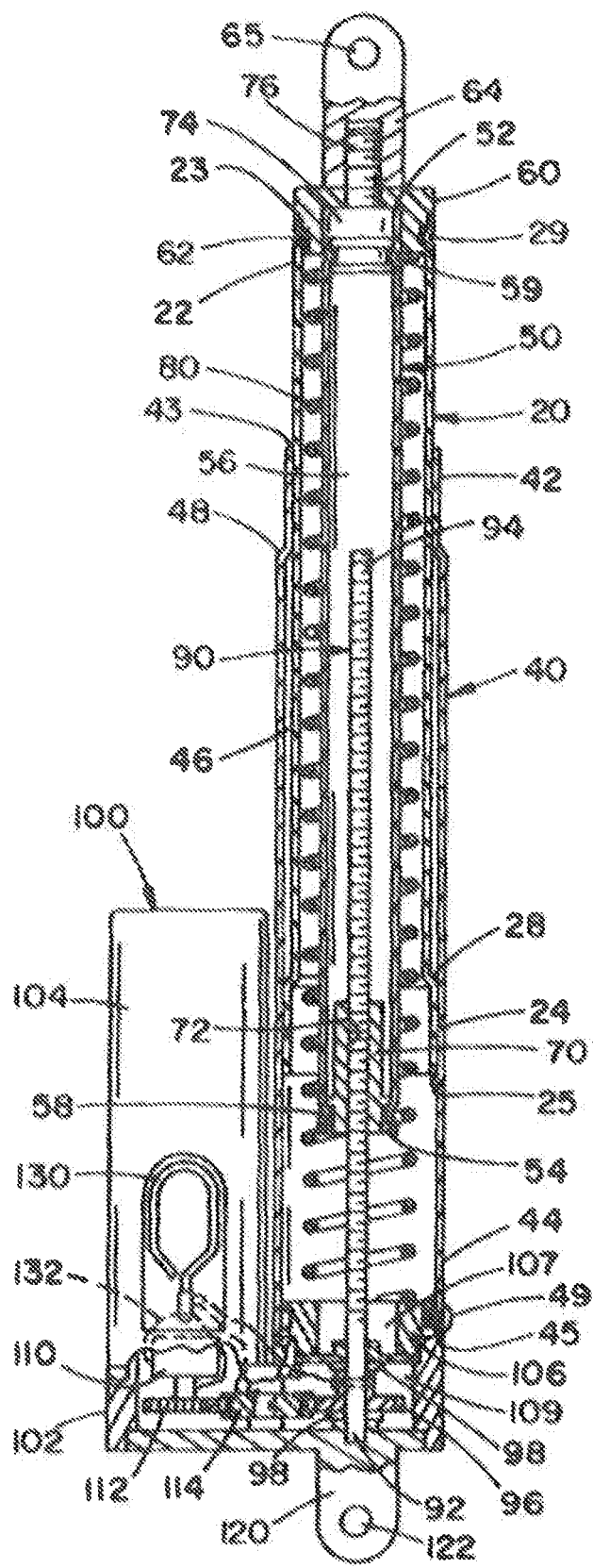
FIG. 3 is a sectional view of the spring system of FIG. 1.

Referring now to the drawings wherein the showings are for the purpose of illustrating non-limiting embodiments of the invention only and not for the purpose of limiting same, FIGS. 1-3 illustrate one non-limiting embodiment of the spring system 10 of the present invention. The spring system includes an inner sleeve 20, an outer sleeve 40, a top rod 50, a bottom rod 90, a coil spring 80, and a drive housing 100. The outer sleeve 40 is a generally cylindrical body that includes a top portion 42 having a top end 43, a bottom portion 44 having a bottom end 45, an internal cavity 46, and a tapered region 48. The cross-sectional area of the internal cavity of the bottom portion of the outer sleeve is greater in size than the internal cavity of the top portion of the outer sleeve. The inner sleeve 20 is a generally cylindrical body that includes a top portion 22 having a top end 23, a bottom portion 24 having a bottom end 25, an internal cavity 26, and a tapered region 28. The cross-sectional area of the internal cavity of the bottom portion of the inner sleeve is greater in size than the internal cavity of the top portion of the inner sleeve. The top portion of the inner sleeve has a cross-sectional shape and size to enable the top portion to move in the internal cavity 46 of the outer sleeve between a fully retracted and fully extended position. The bottom portion of the inner sleeve has a cross-sectional shape and size to enable the bottom portion to move in the internal cavity 46 of the bottom portion of the outer sleeve, but is unable to pass through the internal cavity of the top portion of the outer sleeve. As such, the spring system includes two housing sleeves wherein one housing sleeve is telescopically received by the other housing sleeve and are designed to move relative to one another between compressed (retracted) and expanded (extended) positions. Although not shown, the inner sleeve and/or outer sleeve can optionally include an arrangement that inhibits or presents the relative rotation of the sleeves relative to one another. Such an arrangement ensures that the inner sleeve substantially or only moves along the longitudinal axis of the spring system and has little or no rotational movement about the longitudinal axis of the spring system when the inner sleeve moves between the compressed (retracted) and expanded (extended) positions. In one non-limiting arrangement, the arrangement that inhibits or presents the relative rotation of the sleeves relative to one another includes a groove and/or rib arrangement on the inner and/or outer sleeve. When a groove or rib is used, the groove or rib on at least one of the inner or outer sleeves is positioned along at least 10% of a longitudinal length of the inner sleeve or outer sleeve, typically at least 30% of a longitudinal length of the inner sleeve or outer sleeve, and more typically at least along at least 55% of a longitudinal length of the inner sleeve or outer sleeve.

The top rod 50 has a cross-sectional shape and size to pass through the internal cavity of the inner and outer sleeves. The top rod has a top end 52, a bottom end 54, and an internal cavity 56. A top bushing 60 is connected to the top end 52 of the top rod. The top bushing 60 includes a grooved region 62 that is configured to receive an indent region 29 in the top portion of the inner sleeve that is used to secure at least a portion of the top bushing in the internal cavity of the top portion of the inner sleeve. A connection arrangement 64 having an opening 65 is connected to or formed on the top of the top bushing. As illustrated in FIG. 3, the top bushing and/or connection arrangement can be threadedly connected to a top rod connector 74 that includes a threaded top 76. The top rod connector is connected in the internal cavity of the top end or top portion of the top rod by indents 59. The top bushing can be configured to form a fluid seal in the top portion of the inner sleeve when connected to the inner sleeve; however, this is not required. The size, shape and material of the top bushing are non-limiting. Positioned in the internal cavity 56 at or near the bottom end of the top rod is a bottom rod engagement element in the form of a nut 70. The nut 70 is secured in the internal cavity of the top rod by indent region 58. The nut includes a threaded central passageway 72 that is configured to receive a threaded region on the bottom rod.

The spring 80 is generally shaped to be positioned in the internal cavity of the inner and outer sleeve; however, this is not required. As can be appreciated, more than one spring 80 can be positioned in the internal cavity of the inner and outer sleeve. The shape, size, the spring free length, wire type, wire thickness, cross-sectional shape of the wire, number of windings, wire material, and/or spring force of spring are non-limiting. The spring length of one or more of the springs can be greater than, less than or equal to the longitudinal length of the internal cavity of the outer sleeve. As illustrated in FIG. 3, the spring length of spring 80 is greater than the longitudinal length of the internal cavity of the outer sleeve. As can be appreciated, when two or more springs are used, such springs can be in a nested relationship and have the same or different winding direction when in the nested relationship; however, this is not required.

The bottom portion 92 of the bottom rod 90 is rotatable connected to the drive housing 100. The top portion 94 of the bottom rod is threaded so as to be threadedly engagable in the central passageway 72 of nut 70. As illustrated in FIG. 3, the top portion of bottom rod 90 moves when the internal cavity 56 of the top rod 50 and the inner sleeve 20 moves between the fully extended and fully retracted positions. When the bottom rod rotates in a first direction, the top portion of the bottom rod extends further into the internal cavity of the top rod and thereby causes the inner sleeve to retract into the internal cavity of the outer sleeve and also causes the spring 80 to compress. When the bottom rod rotates in an opposition direction from the first direction, the top portion of the bottom rod retracts from the internal cavity of the top rod and thereby causes the inner sleeve to extend outwardly from the internal cavity of the outer sleeve and also causes the spring 80 to decompress.

The drive housing 100 includes a drive body 102 that includes a motor housing 104 for housing the motor 110 and a bottom or connection bushing 106 to connecting the bottom portion of 44 of the outer sleeve 40 to the drive housing. The connection bushing 106 can be formed as part of the drive housing or can be separately connected to the drive housing. The connection bushing includes a groove region 108 and is configured to receive the ends of one or more connection screws 49 that are inserted through a screw opening 47 in the bottom portion of the outer sleeve to thereby secure the outer sleeve to the drive housing. The connection bushing can be used to form a fluid seal with the outer sleeve; however, this is not required. The bottom surface of the drive housing can optionally include a connection arrangement 120 having an opening 122.

Referring now to FIG. 3, a gear arrangement is housed in the gear cavity 109 of the drive housing to enable the motor to cause the bottom rod to rotate. At the end of motor 110 is a motor gear 112. A rod gear 96 is connected to the bottom end or portion 92 of the bottom rod 90. The bottom portion of the bottom rod passes through a rod opening 107 in connection bushing 106. The rod opening can be used to stabilize the position of the bottom rod along the longitudinal axis of the strut; however, this is not required. One or more flanges or washers 98 on the bottom rod can be used to inhibit or prevent the movement of the bottom rod along the longitudinal axis of the bottom rod; however, this is not required. The rod gear can directly engage the motor gear or one or more intermediate gears 114 can be positioned between the rod gear and the motor gear. The selection of the number of gears and the size of the gears can be used to create a desired gear ratio between the motor and the bottom to cause the bottom rod to rotate at a certain rpm. A motor controller (not shown) can be used to control the speed of the motor and the rotational direction of the motor.

A safety or quick release system can be included in the drive housing. The drive housing can include a manual release pull tab 130. The pull tab can be positioned at any location on the drive housing. As illustrated in FIG. 3, the pull tab is located on the motor housing. The pulling or moving of the pull tab is configured to cause one or more gears in the drive housing to disengage from one another so that the motor can no longer drive the rotation of the bottom rod. The configuration of this release arrangement is non-limiting. In one non-limiting configuration, the pull tab is connected to a cable 132, which in turn is connected to one or more gears (motor gear, intermediate gear, and/or rod gear) to cause the gear to be displaced from its engagement position to a non-engagement position thereby preventing the motor to continue to drive the rotation of the bottom rod. The displaced gear can be configured to be manually repositioned into its engagement position or automatically move to its engagement position after the pull tab is released or after some certain time period has transpired; however, this is not required.

Figure 4:
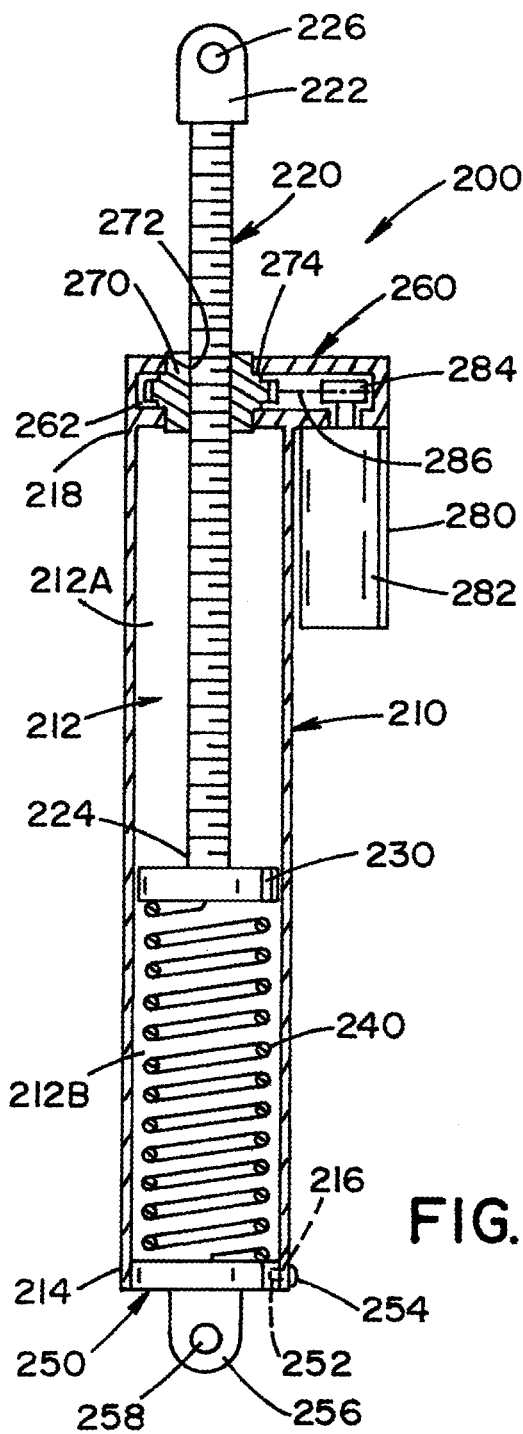
FIG. 4 is a sectional view of another non-limiting embodiment of the spring system in accordance with the present invention.

As illustrated in FIG. 3, top rod 50 has a longitudinal length that is greater that the longitudinal length of the internal cavity of the top rod; however, it can be appreciated that the top rod has a longitudinal length that is equal to or less than the longitudinal length of the internal cavity of the top rod. Although not shown, it can be appreciated that the top rod could include a piston so that one or more mechanical springs can be located above and/or below the piston. A representative arrangement wherein in one or more mechanical springs can be located above and/or below the piston is illustrated in FIGS. 4-6. Such a spring arrangement can be used in the spring system of FIGS. 1-3 if one or more pistons are included on the top rod. As can also be appreciated, a bushing (e.g., a metal bushing, etc.) can optionally be positioned at or near the interface between the inner and outer sleeve. Such a bushing, when used, can be used so that one or more mechanical springs can be located above and/or below the bushing. A representative arrangement wherein in one or more mechanical springs can be located above and/or below the bushing is illustrated in FIGS. 4-6.

Referring now to FIGS. 4-6, additional non-limiting embodiments of the invention are illustrated. In each of the embodiments illustrated in FIGS. 4-6, the drive housing is positioned at the top portion of the spring system whereas the drive housing of the spring system of FIGS. 1-3 was located at the bottom portion of the spring system.

Referring now to FIG. 4, the spring system 200 includes a one-piece tubular housing 210 and a rod member 220 which is axially extendable and retractable relative to the housing. The rod member has a top end 222 and a bottom end 224 that is connected to a piston 230. The piston divides the internal chamber 212 of the housing into a top chamber 212A and a bottom chamber 212 B. Although not shown, the housing and/or rod member can optionally include an arrangement that inhibits or presents the rotation of the housing relative to rod member. Such an arrangement ensures that the rod member substantially or only moves along the longitudinal axis of the housing and has little or no rotational movement about the longitudinal axis of the housing when the rod member moves between the compressed (retracted) and expanded (extended) positions. In one non-limiting arrangement, the arrangement that inhibits or presents the rotation rod member relative to the housing includes a groove and/or rib arrangement on the rod member and/or housing. When a groove or rib is used, the groove or rib on at least one of the rod member or housing is positioned along at least 10% of a longitudinal length of the rod member or housing, typically at least 30% of a longitudinal length of the rod member or housing, and more typically at least along at least 55% of a longitudinal length of the rod member or housing.

As illustrated in FIG. 4, a compression spring 240 is located in bottom chamber 212B. As illustrated in FIG. 5, compression spring 240 is located in top chamber 212A. As illustrated in FIG. 6, compression spring 240 is located in top chamber 212A and a second compression spring 242 is located in bottom chamber 212B. As can be appreciated, more than one compression spring can be located in top chamber 212A and/or bottom chamber 212B. As illustrated in FIGS. 5 and 6, compression spring 240 encircles at least a portion of rod member 220. When two of more compression springs are located in the top chamber and/or the bottom chamber, such springs can be positioned in a nested relationship. The two or more nested springs can have the same and/or a different load versus deflection curves when the rod member moves between a fully extended and fully retracted positions. The two or more nested springs can have the same and/or a different free length. The two or more nested springs can have the same and/or a different wire thickness and/or cross-sectional wire shape. The two or more nested springs can have the same and/or a different spring shape and/or cross-sectional spring shape. The two or more nested springs can be made of the same and/or a different material. The two or more nested springs can have the same and/or a different number of windings per inch. The two or more nested springs can be wound in the same or differing directions with respect to another compression spring.

The top end of rod member 220 can include a connection arrangement 222 having an opening 226. The bottom end or portion 214 of housing 210 can include a bottom bushing 250. The bottom bushing can optionally include a groove region or opening 252 that is configured to receive the ends of one or more connection screws 254 that are inserted through a screw opening 216 in the bottom portion of the housing to thereby secure the bottom bushing to the housing. The connection bushing can be used to form a fluid seal with the outer sleeve; however, this is not required. The bottom bushing can include a connection arrangement 256 having an opening 258.

The drive housing 260 can be formed on or connected to the top end 218 of the housing 210. The drive housing includes a rod engagement element that can optionally be in the form of a threaded nut 270. Threaded nut 270 has a central opening 272 that is threaded. Threaded nut 270 is positioned in a nut cavity 262 of the drive housing. The nut cavity is configured to enable the threaded nut to rotate about the longitudinal axis of central opening 272. The threaded nut can optionally include one or more side flanges 274 or other similar structures to maintain the position and stability of the threaded nut as it rotates in the nut cavity. The threaded nut can be configured to form a fluid seal with the drive housing; however, this is not required. As illustrated in FIGS. 4-6, the threaded portion of connection rod 220 passes through threaded central opening 272 of threaded nut 270. When the threaded nut is rotated in a first direction, the connection rod 220 is caused to extend outwardly from the housing. When the threaded nut is rotated in a direction opposite the first direction, the connection rod 220 is caused to retract into the internal cavity of the housing.

The drive housing includes a motor housing 280 that includes a motor 282. The motor can be connected or interconnected to the threaded nut by a gear system, belts, etc. As illustrated in FIGS. 4-6, the end of motor 282 includes a grooved belt wheel 284 that retains a belt 286. When the motor is activated, the belt wheel is cause to rotate, which in turn causes the belt to move about the belt wheel and cause the threaded nut to rotate in the nut cavity. The type of motor that can be used can be similar to the type of motor described in FIGS. 1-3. The drive housing can optionally include a safety or quick release system that causes the motor to disengage from the threaded nut. If the drive housing includes a gear system to drive the threaded nut, the safety or quick release system can be the same or similar to the safety or quick release system as described with respect to FIGS. 1-3. If a belt or chain is used to drive the threaded nut, the safety or quick release system can be configured to so as to cause the desired disengagement of the motor from driving the rotation of the threaded nut.

As illustrated in FIGS. 1-6, the longitudinal axis of the motor is parallel to the longitudinal axis of the outer sleeve or housing; however, it can be appreciated that the longitudinal axis of the motor can be normal to the longitudinal axis of the outer sleeve or housing or at some other angle relative to the longitudinal axis of the outer sleeve or housing.

While considerable emphasis has been placed herein on the structures and configurations of the preferred embodiments of the invention, it will be appreciated that other embodiments, as well as modifications of the embodiments disclosed herein, can be made without departing from the principles of the invention. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

What is claimed:
1. A strut system comprising:
  a top sleeve having an internal chamber;
  a bottom sleeve having an internal chamber and arranged for sliding displacement relative to said top sleeve, said top and bottom sleeves slidably connected together;
  a top rod positioned in and connected to said internal chamber of said top sleeve, said top rod connected to said top sleeve such that said top rod does not rotate relative to said top sleeve, said top rod includes an internal cavity and a bottom rod connector secured in said internal cavity, said bottom rod connector including a threaded opening;
  a bottom rod positioned in and connected to said internal chamber of said bottom sleeve, said bottom rod rotatably and threadedly connected to said top rod, a bottom portion of said bottom rod including a rod gear, a top portion of said bottom rod extending into said internal cavity of said top rod and configured to move within said internal cavity when said top sleeve moves between said extended and retracted positions, said bottom rod not connected to said top sleeve, said bottom rod connector threadedly connected to a threaded portion of said bottom rod; and
  a drive system, said drive system including a base mount, a motor, a motor housing, a gear drive system, and a manual drive motor release, said base mount connected to a bottom portion of said bottom sleeve and a bottom portion of said motor housing, said gear drive system including one or more intermediate gears, said motor at least partially positioned in said motor housing, said motor housing spaced from said top and bottom sleeves and not contained in said bottom and top sleeves, said gear drive system interconnecting said motor to said bottom rod to enable said motor to cause rotation of said bottom rod, said gear drive system including one or more gears selected from the group consisting of a motor gear that is connected to said motor, intermediate gear, and a rod gear connected to said bottom rod, said manual drive motor release including a manual release arrangement that can be used by a user to manually terminate said motor from driving rotation of said bottom rod when said manual release is used by the user, said manual release arrangement configured to cause at least one gear of said gear drive system to be repositioned from its engagement position when said manual release is used by said user;
  a mechanical spring positioned in said internal chamber of said bottom sleeve, said internal chamber of said top sleeve, or combinations thereof, said mechanical spring not connected at either end to said top sleeve or said bottom sleeve;
  and wherein rotation of said bottom rod in a first direction causes said top rod to move in a direction that causes said top sleeve to move to an extended position, and wherein rotation of said bottom rod in a direction opposite said first direction causes said top rod to move in a direction that causes said top sleeve to move to a retracted position;
  and wherein at least a portion of said manual release pull arrangement is located on an exterior of said motor housing.

2. The strut system as defined in claim 1, wherein a longitudinal length of said top rod is greater than a longitudinal length of said internal chamber of said top sleeve.

3. The strut system as defined in claim 1, wherein a longitudinal length of said bottom rod is less than a longitudinal length of said internal chamber of said bottom sleeve.

4. The strut system as defined in claim 1, wherein a longitudinal axis of said motor housing is parallel to a longitudinal axis of said bottom rod, said motor housing extending upwardly from said base mount a length that is less than a longitudinal length of said bottom sleeve.

5. The strut system as defined in claim 1, including an anti-rotation arrangement on said top sleeve, said bottom sleeve, or combinations thereof to prevent rotation of said top sleeve relative to said bottom sleeve when said top sleeve moves between said extend and said retracted position.

6. The strut system as defined in claim 5, wherein said anti-rotation arrangement includes a groove or rib positioned along at least 10% of a longitudinal length of said top sleeve, said bottom sleeve, or combinations thereof.

7. The strut system as defined in claim 1, wherein said strut system remains operable via said mechanical spring after said user activates said manual release arrangement.

8. A strut system comprising:
a top sleeve having an internal chamber;
a bottom sleeve having an internal chamber and arranged for sliding displacement relative to said top sleeve, said top and bottom sleeves slidably connected together;
a top rod positioned in and connected to said internal chamber of said top sleeve, said top rod includes an internal cavity and a bottom rod connector secured in said internal cavity, said bottom rod connector including a threaded opening, a longitudinal length of said top rod is greater than a longitudinal length of said internal chamber of said top sleeve, said top rod connected to said top sleeve such that said top rod does not rotate relative to said top sleeve;
a bottom rod positioned in and connected to said internal chamber of said bottom sleeve, said bottom rod connected to said top rod, a bottom portion of said bottom rod including a rod gear, said bottom rod including a threaded portion connected to said threaded opening of said bottom rod connector, a top portion of said bottom rod configured to move within said internal cavity of said top rod when said top sleeve moves between said extended and retracted positions, a longitudinal length of said bottom rod is less than a longitudinal length of said internal chamber of said bottom sleeve, said bottom rod not connected to said top sleeve;
a mechanical spring positioned in said internal chamber of said bottom sleeve, said internal chamber of said top sleeve, or combinations thereof, said mechanical spring not connected at either end to said top sleeve or said bottom sleeve, a free length of said mechanical spring is greater than a longitudinal length of said internal chamber of said top sleeve; and,
a drive system, said drive system including a base mount, a motor, a motor housing, a gear drive system, and a manual drive motor release, said base mount connected to a bottom portion of said bottom sleeve and a bottom portion of said motor housing, said gear drive system including one or more intermediate gears, said motor at least partially positioned in said motor housing, said motor housing spaced from said top and bottom sleeves and not contained in said bottom and top sleeves, said gear drive system interconnecting said motor to said bottom rod to enable said motor to cause rotation of said bottom rod, said gear drive system including one or more gears selected from the group consisting of a motor gear that is connected to said motor, intermediate gear, and a rod gear connected to said bottom rod, a longitudinal axis of said motor housing is parallel to a longitudinal axis of said bottom rod, said motor housing extending upwardly from said base mount a length that is less than a longitudinal length of said bottom sleeve, said manual drive motor release including a manual release arrangement that can be used by a user to manually terminate said motor from driving rotation of said bottom rod when said manual release is used by the user, said manual release arrangement configured to cause at least one gear of said gear drive system to be repositioned from its engagement position when said manual release is used by said user, said manual release arrangement including a pull tab positioned on an outer surface of said motor housing and a cable that is connected between said pull tab and said gear drive system;
and wherein rotation of said bottom rod in a first direction causes said top rod to move in a direction that causes said top sleeve to move to an extended position, and wherein rotation of said bottom rod in a direction opposite said first direction causes said top rod to move in a direction that causes said top sleeve to move to a retracted position.

9. The strut system as defined in claim 8, including an anti-rotation arrangement on said top sleeve, said bottom sleeve, or combinations thereof to prevent rotation of said top sleeve relative to said bottom sleeve when said top sleeve moves between said extend and said retracted position, said anti-rotation arrangement includes a groove or rib positioned along at least 10% of a longitudinal length of said top sleeve, said bottom sleeve, or combinations thereof.

10. The strut system as defined in claim 8, wherein said top sleeve including a main body having a top portion, a middle portion, and a bottom portion, a maximum outer diameter of said bottom portion of said top sleeve is greater than an outer diameter of said mid portion of said top sleeve, said bottom sleeve including a main body having a top portion, a middle portion, and a bottom portion, a maximum outer diameter of said top portion of said bottom sleeve is less than an outer diameter of said middle portion of said bottom sleeve, said middle portion of said top sleeve having an outer diameter to enable said middle portion to pass through said top portion of said bottom sleeve, said top sleeve arranged for sliding displacement relative to said bottom sleeve, said top and bottom sleeves slidably connected together and said top sleeve moveable relative to said bottom sleeve between a fully extended and a retracted position, said bottom portion of said top sleeve having a greater outer diameter than an inner diameter of said top portion of said bottom sleeve, said top portion of said bottom sleeve and said bottom portion of said top sleeve configured to engage one another when said top sleeve has moved to said fully extended position thereby preventing said top and bottom sleeves from separating from one another.

11. The strut system as defined in claim 8, including a bottom bushing positioned at the bottom portion of said bottom sleeve, said bottom bushing including an opening, said bottom rod extending through said opening of said bottom bushing, a bottom end of said mechanical spring supported by a top surface of said bushing, a top portion of said bottom bushing extending at least partially into said internal chamber of said bottom sleeve.

12. The strut system as defined in claim 8, including an anti-rotation arrangement on said top sleeve, said bottom sleeve, or combinations thereof to prevent rotation of said top sleeve relative to said bottom sleeve when said top sleeve moves between said extended and said retracted position, said anti-rotation arrangement includes a groove or rib positioned along at least 10% of a longitudinal length of said top sleeve, said bottom sleeve, or combinations thereof.

13. The strut system as defined in claim 12, wherein a bottom portion of said top sleeve includes a variable diameter portion, a top portion of said bottom sleeve including a variable diameter portion, said variable diameter portions of said top and bottom sleeves preventing said top and bottom sleeves from separating from one another.

14. The strut system as defined in claim 13, including a bottom bushing positioned at the bottom portion of said bottom sleeve, said bottom bushing including an opening, said bottom rod extending through said opening of said bottom bushing, a bottom end of said mechanical spring supported by a top surface of said bushing, a top portion of said bottom bushing extending at least partially into said internal chamber of said bottom sleeve.

15. The strut system as defined in claim 8, wherein said strut system remains operable via said mechanical spring after said user activates said manual release arrangement.

16. A strut system comprising:
a top sleeve having an internal chamber;
a bottom sleeve having an internal chamber and arranged for sliding displacement relative to said top sleeve, said top and bottom sleeves slidably connected together;
a top rod positioned in and connected to said internal chamber of said top sleeve, said top rod connected to said top sleeve such that said top rod does not rotate relative to said top sleeve, said top rod includes an internal cavity and a bottom rod connector secured in said internal cavity, said bottom rod connector including a threaded opening;
a bottom rod positioned in and connected to said internal chamber of said bottom sleeve, said bottom rod rotatably and threadedly connected to said top rod, a bottom portion of said bottom rod including a rod gear, a top portion of said bottom rod extending into said internal cavity of said top rod and configured to move within said internal cavity when said top sleeve moves between said extended and retracted positions, said bottom rod not connected to said top sleeve, said bottom rod connector threadedly connected to a threaded portion of said bottom rod;
a mechanical spring positioned in said internal chamber of said bottom sleeve, said internal chamber of said top sleeve, or combinations thereof, said mechanical spring not connected at either end to said top sleeve or said bottom sleeve; and,
a drive system, said drive system including a base mount, a motor, a motor housing, a gear drive system, and a manual drive motor release, said base mount connected to a bottom portion of said bottom sleeve and a bottom portion of said motor housing, said gear drive system including one or more intermediate gears, said motor at least partially positioned in said motor housing, said motor housing spaced from said top and bottom sleeves and not contained in said bottom and top sleeves, said gear drive system interconnecting said motor to said bottom rod to enable said motor to cause rotation of said bottom rod, said gear drive system including one or more gears selected from the group consisting of a motor gear that is connected to said motor, intermediate gear, and a rod gear connected to said bottom rod, said manual drive motor release including a manual release arrangement that can be used by a user to manually terminate said motor from driving rotation of said bottom rod when said manual release is used by the user, said manual release arrangement configured to cause at least one gear of said gear drive system to be repositioned from its engagement position when said manual release is used by said user, at least a portion of said manual release arrangement located on an exterior of said motor housing;
and wherein said bottom sleeve continues to be slidably displaceable relative to said top sleeve after said user causes said motor to be manually disengaged from said gear drive system;
and wherein rotation of said bottom rod in a first direction causes said top rod to move in a direction that causes said top sleeve to move to an extended position, and wherein rotation of said bottom rod in a direction opposite said first direction causes said top rod to move in a direction that causes said top sleeve to move to a retracted position.

17. The strut system as defined in claim 16, wherein said manual release arrangement includes a pull tab positioned on an outer surface of said motor housing and a cable that is connected between said pull tab and said gear unit.

18. The strut system as defined in claim 16, said manual release arrangement is configured to cause a gear unit to move to an engagement position when said user releases said manual release arrangement.

19. The strut system as defined in claim 17, said manual release arrangement is configured said to cause a gear unit to move to an engagement position when said user releases said manual release arrangement.

20. The strut system as defined in claim 16, including an anti-rotation arrangement on said top sleeve, said bottom sleeve, or combinations thereof to prevent rotation of said top sleeve relative to said bottom sleeve when said top sleeve moves between said extend and said retracted position, said anti-rotation arrangement includes a groove or rib positioned along at least 10% of a longitudinal length of said top sleeve, said bottom sleeve, or combinations thereof.

21. The strut system as defined in claim 19, including an anti-rotation arrangement on said top sleeve, said bottom sleeve, or combinations thereof to prevent rotation of said top sleeve relative to said bottom sleeve when said top sleeve moves between said extend and said retracted position, said anti-rotation arrangement includes a groove or rib positioned along at least 10% of a longitudinal length of said top sleeve, said bottom sleeve, or combinations thereof.

22. The strut system as defined in claim 16, wherein said top sleeve includes a main body having a top portion, a middle portion, and a bottom portion, a maximum outer diameter of said bottom portion of said top sleeve is greater than an outer diameter of said middle portion of said top sleeve, said bottom sleeve including a main body having a top portion, a middle portion, and a bottom portion, a maximum outer diameter of said top portion of said bottom sleeve is less than an outer diameter of said middle portion of said bottom sleeve, said middle portion of said top sleeve having an outer diameter to enable said middle portion to pass through said top portion of said bottom sleeve, said top sleeve arranged for sliding displacement relative to said bottom sleeve, said top and bottom sleeves slidably connected together and said top sleeve moveable relative to said bottom sleeve between a fully extended and a retracted position, said bottom portion of said top sleeve having a greater outer diameter than an inner diameter of said top portion of said bottom sleeve, said top portion of said bottom sleeve and said bottom portion of said top sleeve configured to engage one another when said top sleeve has moved to said fully extended position thereby preventing said top and bottom sleeves from separating from one another.

23. The strut system as defined in claim 21, wherein said top sleeve includes a main body having a top portion, a middle portion, and a bottom portion, a maximum outer diameter of said bottom portion of said top sleeve is greater than an outer diameter of said middle portion of said top sleeve, said bottom sleeve including a main body having a top portion, a middle portion, and a bottom portion, a maximum outer diameter of said top portion of said bottom sleeve is less than an outer diameter of said middle portion of said bottom sleeve, said middle portion of said top sleeve having an outer diameter to enable said middle portion to pass through said top portion of said bottom sleeve, said top sleeve arranged for sliding displacement relative to said bottom sleeve, said top and bottom sleeves slidably connected together and said top sleeve moveable relative to said bottom sleeve between a fully extended and a retracted position, said bottom portion of said top sleeve having a greater outer diameter than an inner diameter of said top portion of said bottom sleeve, said top portion of said bottom sleeve and said bottom portion of said top sleeve configured to engage one another when said top sleeve has moved to said fully extended position thereby preventing said top and bottom sleeves from separating from one another.

24. The strut system as defined in claim 16, wherein said strut system remains operable via said mechanical spring after said user activates said manual release arrangement.

25. The strut system as defined in claim 16, wherein said strut system remains operable via said mechanical spring after said user activates said manual release arrangement.

\* \* \* \* \*